(12) United States Patent
Yoo (10) Patent No.: US 8,226,116 B2
(45) Date of Patent: Jul. 24, 2012

(54) VEHICLE AIRBAG SYSTEM

(75) Inventor: Jae Haeng Yoo, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 335 days.

(21) Appl. No.: 12/617,205

(22) Filed: Nov. 12, 2009

(65) Prior Publication Data

US 2010/0270783 A1 Oct. 28, 2010

(30) Foreign Application Priority Data

Apr. 28, 2009 (KR) .................. 10-2009-0036920

(51) Int. Cl.
*B60R 21/239* (2006.01)
(52) U.S. Cl. .................................... 280/739; 280/743.2
(58) Field of Classification Search .................. 280/739, 280/733, 743.2, 728.2, 736
See application file for complete search history.

(56) References Cited

U.S. PATENT DOCUMENTS

| 6,409,213 | B2 * | 6/2002 | Webber et al. ............. 280/739 |
| 6,669,231 | B2 * | 12/2003 | Ryan ........................... 280/736 |
| 6,830,265 | B2 * | 12/2004 | Ford ............................ 280/739 |
| 7,036,843 | B2 * | 5/2006 | Okamoto et al. .......... 280/728.3 |
| 7,431,336 | B2 * | 10/2008 | Karlow et al. ............. 280/739 |
| 7,510,212 | B2 * | 3/2009 | Green et al. ............... 280/743.2 |
| 7,775,554 | B2 * | 8/2010 | Smydra et al. ............. 280/736 |
| 2005/0104347 | A1 * | 5/2005 | Hawthorn et al. ......... 280/739 |
| 2005/0146122 | A1 * | 7/2005 | Gould et al. ............... 280/739 |
| 2006/0192370 | A1 * | 8/2006 | Abe et al. .................. 280/735 |
| 2006/0244247 | A1 * | 11/2006 | Debler et al. ............... 280/739 |
| 2006/0290119 | A1 * | 12/2006 | Thomas et al. ............. 280/739 |
| 2007/0063493 | A1 * | 3/2007 | Higuchi et al. ............. 280/733 |
| 2007/0170709 | A1 * | 7/2007 | Braun et al. ................ 280/739 |
| 2008/0007031 | A1 * | 1/2008 | Choi .......................... 280/728.2 |
| 2008/0258447 | A1 | 10/2008 | Hall et al. |

* cited by examiner

*Primary Examiner* — Ruth Ilan
*Assistant Examiner* — Nicole Verley
(74) *Attorney, Agent, or Firm* — Morgan, Lewis & Bockius LLP (57) ABSTRACT

A vehicle airbag system may include an inflator supplying a gas to an airbag cushion, an airbag housing coupled with the inflator and having a housing vent hole to discharge a part of the gas supplied from the inflator, a retainer mounted in the airbag housing and coupled to the inflator, wherein the airbag cushion covers an opening of the retainer to supply the gas in the airbag cushion, the retainer including a guide hole and a retainer vent hole, and a tether connected to the airbag cushion at a first end portion thereof and fixed to the airbag housing at a second end portion thereof by passing through the guide hole of the retainer, wherein the tether includes a communication portion at the second portion thereof to form a hole therein so as to selectively permit an gas commutation between the airbag cushion and the outside through the retainer vent hole, the housing vent hole, and the hole of the communication portion.

10 Claims, 6 Drawing Sheets

FIG. 6

VEHICLE AIRBAG SYSTEM

CROSS-REFERENCE TO RELATED APPLICATION

The present application claims priority to Korean Patent Application No. 10-2009-0036920, filed on Apr. 28, 2009, the entire contents of which is incorporated herein for all purposes by this reference.

BACKGROUND OF THE INVENTION

1. Field of the Invention

The present invention relates, in general, to a vehicle airbag system capable of minimizing the impact applied to passengers as a result of a collision and, more particularly, to a vehicle airbag system capable of properly adjusting an airbag gas supplied to an airbag cushion depending on the position of a passenger.

2. Description of Related Art

Generally, an airbag system is mounted in the steering wheel or instrument panel of a vehicle to protect a driver and a passenger in case of collision. This airbag system deploys an airbag cushion when there is a collision, so that it can prevent the driver or passenger from striking a crash pad or the windshield from inside the vehicle.

However, when a child occupies the seat or a child is seated in front of the airbag system, the child would be injured by the instantaneous inflation of the airbag cushion.

Accordingly, there is required a technique which, when the passenger is adjacent to the airbag system, discharges some of the airbag gas before a strong impact is made by the airbag cushion to thereby reduce any injury which would result from impacting with the airbag cushion, and, when the passenger is distant from the airbag system, inhibiting the discharge of the airbag gas to rapidly deploy the airbag cushion.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a vehicle airbag system capable of preventing a passenger from being injured by abruptly inflating an airbag cushion when the passenger is adjacent to the vehicle airbag system and to provide a vehicle airbag system capable of inhibiting discharge of an airbag gas so that an airbag cushion is rapidly deployed when the passenger is far away from the vehicle airbag system.

In an aspect of the present invention, the vehicle airbag system may include an inflator supplying an airbag gas to an airbag cushion, an airbag housing coupled with the inflator and having at least one housing vent hole discharging part of the airbag gas, a tether connected to the airbag cushion at a first end thereof and fixed to the airbag housing at a second end thereof, a retainer mounted in the airbag housing and guiding a movement of the tether, and a restrictor coupled to the second end of the tether and blocking the housing vent hole when pulled by the tether.

The tether may include a communication portion, which provides a channel for the airbag gas when pulled, at the second end thereof, and the restrictor is coupled to the communication portion.

The tether may be located opposite the inflator at the first end thereof such that the airbag gas is guided towards the housing vent hole when initial deployment of the airbag cushion is obstructed by a passenger.

The retainer may include at least one retainer vent hole opposite the housing vent hole, and a pair of guide holes formed in a row in a pulling direction of the tether and supporting the tether.

The restrictor may be connected to the communication portion via ring portions and is located between the housing vent hole and the retainer vent hole when the airbag cushion is deployed.

The restrictor may be connected to the communication portion such that tear lines are formed, and the retainer includes cutoff member tearing out the tear lines when the airbag cushion is deployed.

In another aspect of the present invention, the vehicle airbag system may include an inflator supplying a gas to an airbag cushion, an airbag housing coupled with the inflator and having a housing vent hole to discharge a part of the gas supplied from the inflator, a retainer mounted in the airbag housing and coupled to the inflator, wherein the airbag cushion covers an opening of the retainer to supply the gas in the airbag cushion, the retainer including a guide hole and a retainer vent hole, and a tether connected to the airbag cushion at a first end portion thereof and fixed to the airbag housing at a second end portion thereof by passing through the guide hole of the retainer, wherein the tether includes a communication portion at the second portion thereof to form a hole therein so as to selectively permit an gas commutation between the airbag cushion and the outside through the retainer vent hole, the housing vent hole, and the hole of the communication portion.

A restrictor may be coupled to the communication portion at the second end portion of the tether and blocks a fluid communication between the retainer and the outside through the housing vent hole and the retainer vent hole when the restrictor is pulled by the second end portion of the tether, wherein the second end portion of the tether having the communication portion is folded between the airbag housing and the retainer and the restrictor is disposed between the airbag housing and the retainer to allow the fluid communication between the retainer and the outside through the housing vent hole and the retainer vent hole when initial deployment of the airbag cushion is obstructed.

The restrictor may include a ring portion to be slidably coupled to the communication portion, wherein the ring portion of the restrictor is connected to the communication portion by tear lines and the retainer includes cutoff member to tear out the tear lines when the airbag cushion is fully deployed.

According to various aspects of the present invention, when the passenger is adjacent to the vehicle airbag system, the tether reduces pressure of the airbag gas, so that the vehicle airbag system can prevent injury to the passenger as a result of the pressure used to inflate the airbag cushion. When the airbag cushion is normally deployed, the airbag gas is prevented from being discharged to the outside through the housing vent hole, so that the airbag cushion can be rapidly deployed.

In particular, when the passenger is far away from the vehicle airbag system, more of the airbag gas is introduced into the airbag cushion through the communication portion of the tether when the vent holes are blocked, so that the passenger can be protected by the airbag cushion as normal.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
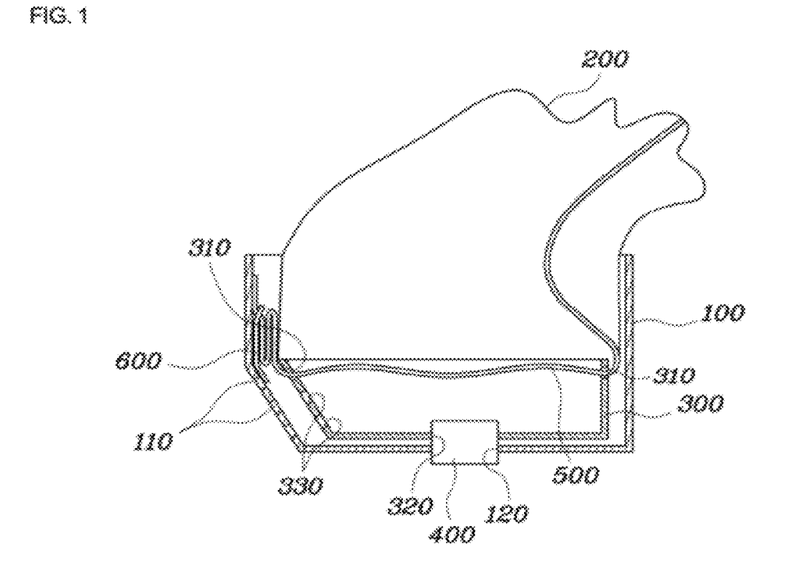
FIG. 1 is a partial cross-sectional view illustrating a vehicle airbag system according to an exemplary embodiment of the present invention.
Figure 2:
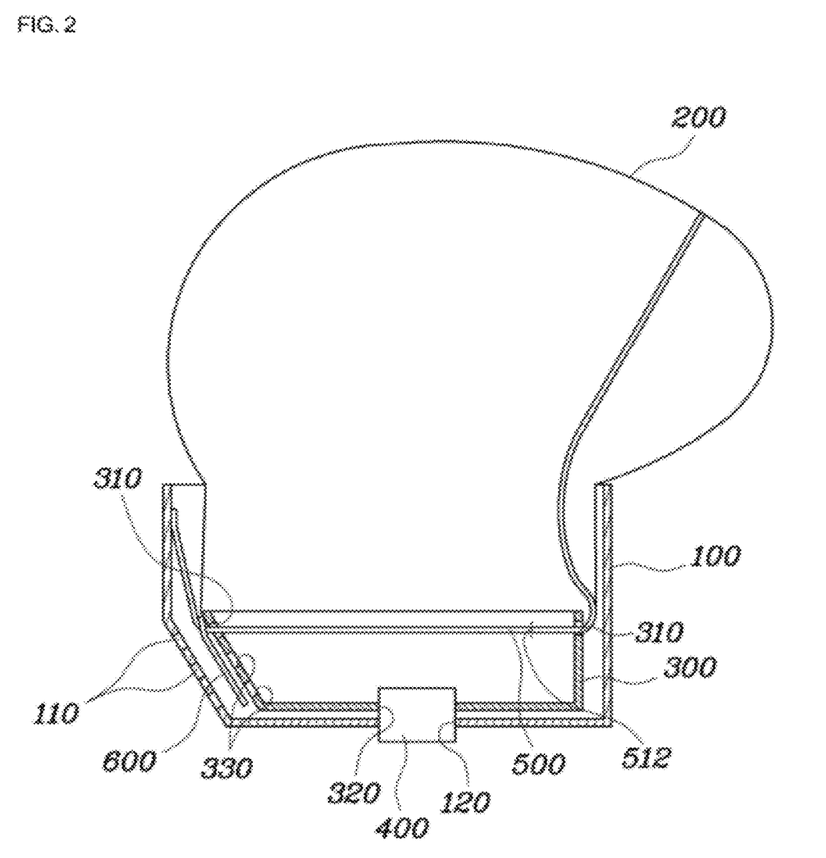
FIG. 2 is a partial cross-sectional view illustrating a vehicle airbag system when an airbag cushion is fully deployed in accordance with an exemplary embodiment of the present invention.
Figure 3:
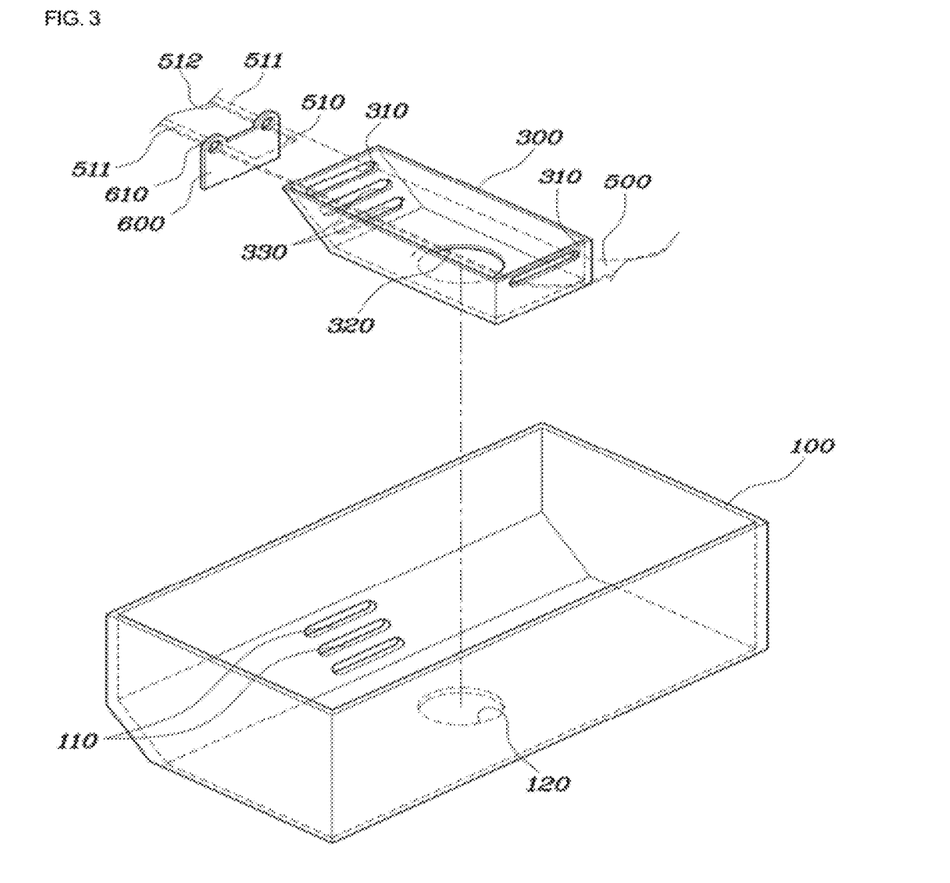
FIG. 3 is an exploded perspective view illustrating an airbag housing and retainer for a vehicle airbag system according to an exemplary embodiment of the present invention.
Figure 4:
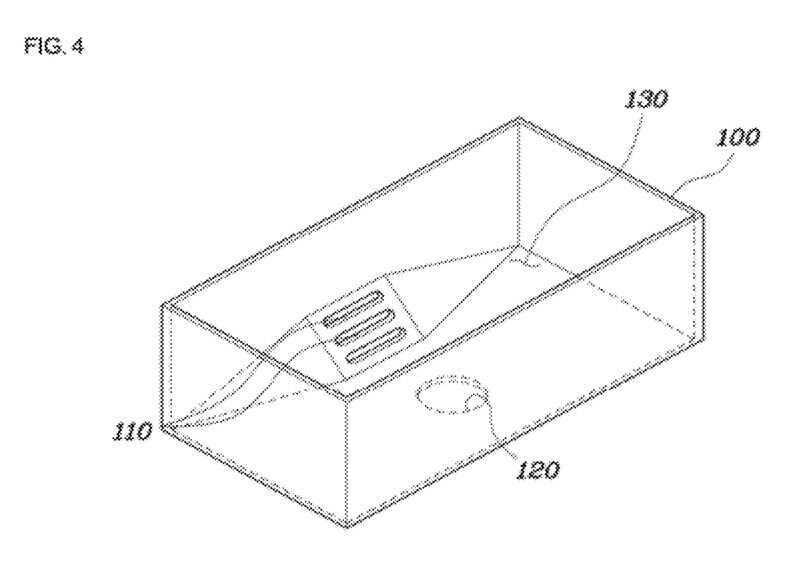
FIG. 4 is a perspective view illustrating an airbag housing for a vehicle airbag system according to another exemplary embodiment of the present invention.

FIG. 1 is a partial cross-sectional view illustrating a vehicle airbag system according to an exemplary embodiment of the present invention. FIG. 2 is a partial cross-sectional view illustrating a vehicle airbag system when an airbag cushion is fully deployed in accordance with an exemplary embodiment of the present invention. FIG. 3 is an exploded perspective view illustrating an airbag housing and retainer for a vehicle airbag system according to an exemplary embodiment of the present invention. FIG. 4 is a perspective view illustrating an airbag housing for a vehicle airbag system according to another exemplary embodiment of the present invention.

As illustrated in FIGS. 1 through 3, a vehicle airbag system of the present invention includes an inflator 400, an airbag housing 100, a tether 500, a retainer 300, and a restrictor 600, and realizes a technique for inducing the discharge of an airbag gas when a passenger is adjacent to the airbag system, and inhibiting the discharge of the airbag gas when the passenger is far away from the airbag system.

More specifically, the inflator 400 receives an operation signal from a sensor (not shown) upon collision, and burns a gas generator, thereby supplying the airbag gas to the airbag cushion 200. The inflator 400 is mounted on the airbag housing 100 such that an outlet of the airbag gas communicates with the interior of the airbag cushion 200.

The airbag housing 100 is a case in which the inflator 400, tether 500, retainer 300, and restrictor 600 are installed, and is provided with a housing mount hole 120, into which the inflator 400 is inserted, in a bottom thereof The airbag housing 100 is provided with a housing vent hole 110, through which some of the generated airbag gas is discharged, on one side thereof. The housing vent hole 110 is elongated on one side of the airbag housing 100 in a lengthwise direction, and is plural in number so as to be separated in a top-down direction of the airbag housing 100.

In the vehicle airbag system as described above, the housing vent holes 110 are formed on one side of the airbag housing 100. However, the housing vent holes of the airbag housing 100 may change their position.

For example, as illustrated in FIG. 4, the airbag housing 100 may be provided with predetermined spaces 130 on one side thereof centering the housing vent holes 110. The entire airbag housing 100 may be implemented in the shape of a rectangular cuboid using the spaces 130. Owing to these spaces 130, the airbag cushion 200 may be housed in the airbag housing 100 which is larger in size.

The retainer 300 is installed in the airbag housing 100, and communicates with the outlet of the inflator 400. The retainer 300 is fixed inside the airbag housing 100, supports the airbag cushion 200, and is connected to the airbag cushion 200 at an open upper portion thereof. The retainer 300 is provided with a retainer mount hole 320, into which the inflator 400 is inserted, in the bottom thereof.

Opposite sides of the retainer 300 are provided with guide holes 310 guiding movement of the tether 500. The guide holes 310 are provided in a pair on the opposite sides of the retainer 300. The tether 500 passes through the pair of guide holes 310.

One side of the retainer 300 is provided with at least one retainer vent hole 330. The retainer vent hole 330 is located opposite the housing vent holes 110 of the airbag housing 100, so that the airbag gas introduced into the retainer 300 can flow through the retainer vent hole 330 and then to the outside through the housing vent holes 110.

Meanwhile, the tether 500 is configured to connect the airbag housing 100 and the airbag cushion 200, and functions to hold the airbag cushion 200 in a shape when the airbag cushion 200 is deployed. In this embodiment, the tether 500 may also function to adjust the airbag gas introduced into the airbag cushion 200 in addition to the above-mentioned function.

For this purpose, the tether 500 is fixed to the airbag cushion 200 at one end thereof; and to the airbag housing 100 at the other end thereof. The other end of the tether 500 which is connected to the airbag housing 100 is provided with a communication portion 510 through which the airbag gas can flow. The communication portion 510 has the shape of a hole 512, which is formed in the other end of the tether 500 in a lengthwise direction, and thus provides a channel of the airbag gas which passes through the tether 500. The communication portion 500 has cord-shaped tethers 511 branching off along edges thereof.

Figure 5A:
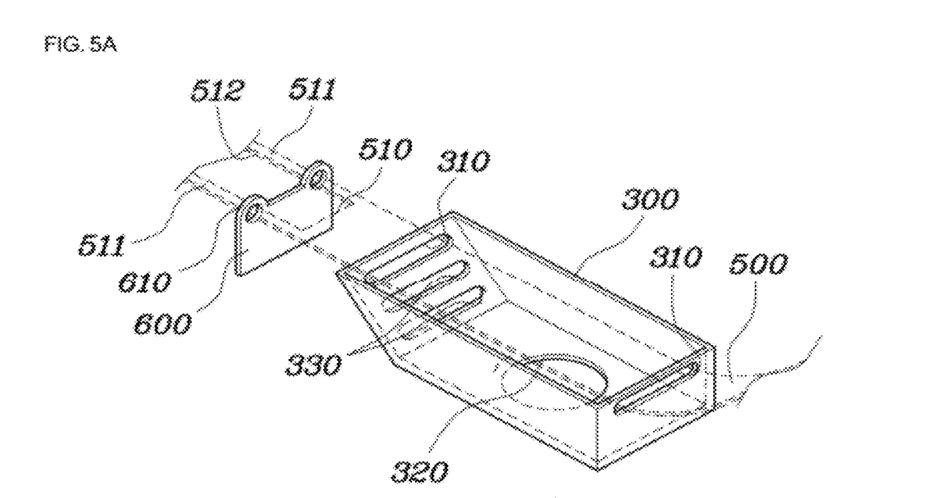
FIG. 5A illustrates a vehicle airbag system according to an exemplary embodiment of the present invention before an airbag cushion is inflated.
Figure 5B:
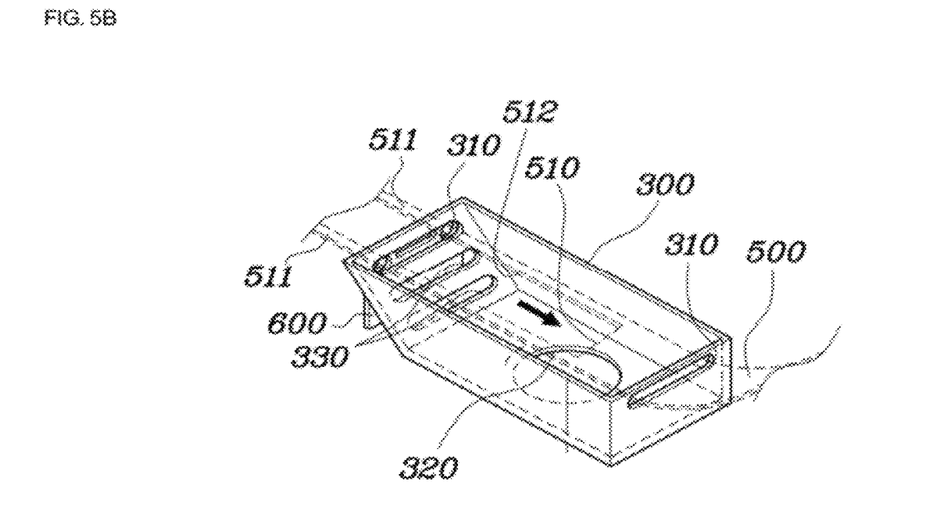
FIG. 5B illustrates a vehicle airbag system according to an exemplary embodiment of the present invention after an airbag cushion is inflated.

Thus, as illustrated in FIG. 5A, when the airbag cushion is inflated to a predetermined volume, the tether 500 is pulled by the inflating the airbag cushion 200. At this time, when the communication portion 510 enters into the retainer 300, the airbag gas flows through the communication portion 510, and thus inflates the airbag cushion 200 even further, as illustrated in FIG. 5B.

Further, the communication portion 510 is coupled such that the restrictor 600 for preventing the discharge of the airbag gas can move in the lengthwise direction of the tether 500. The restrictor 600 is connected to the communication portion 510 by ring portions 610, and is located between the housing vent holes 110 and the retainer vent holes 330 by the tether 500 being pulled when the airbag cushion 200 deploys. In this manner, when located between the housing vent holes 110 and the retainer vent holes 330, the restrictor 600 may prevent the airbag gas from being discharged through the housing vent hole 110, and thus the airbag cushion 200 may be rapidly deployed.

Figure 6:
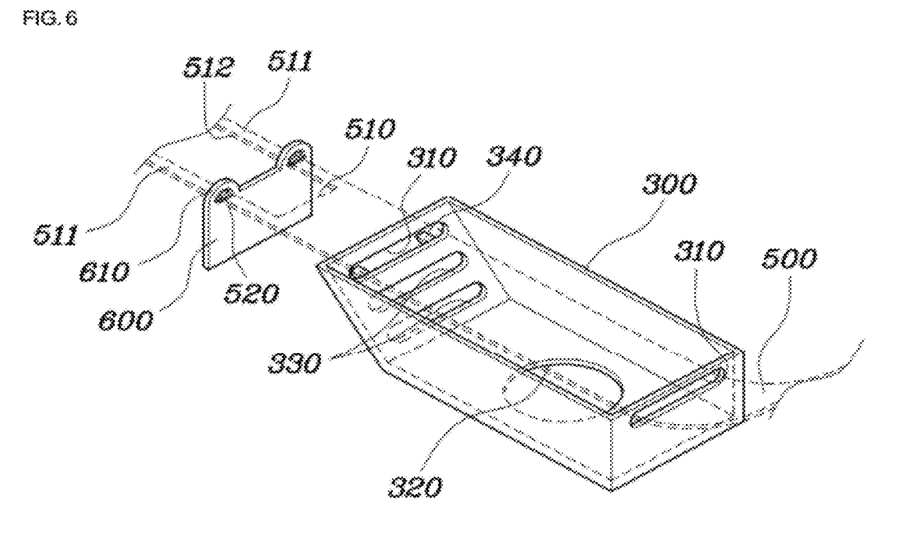
FIG. 6 is a perspective view illustrating a retainer and tether for a vehicle airbag system according to another exemplary embodiment of the present invention.

As illustrated in FIG. 6, the restrictor 600 is fixed to the communication portion 510 such that tear lines 520 are formed. The retainer 300 may be provided with cutoff member 340 capable of tearing out the tear lines 520. In detail, the communication portion 510 is sewn to the restrictor 600 at a predetermined position, and the tear lines 520 are formed at the sewn parts. The cutoff member 340 is formed on the retainer 300 corresponding to the tear lines 520 when the tether 500 is pulled.

Thus, when the tether 500 is pulled by the deploying airbag cushion 200, the tear lines 520 of the restrictor 600 strike the cutoff member 340 of the retainer 300, and thus are torn out. The restrictor 600 separated from the tether 500 is located between the housing vent holes 110 and the retainer vent holes 330 although the tether 500 continues to be pulled, so that it is possible to prevent the airbag gas from being discharged through the housing vent holes 110.

An operation of the vehicle airbag system having this configuration will be described below in connection with the case where the passenger is adjacent to the vehicle airbag system and the case where the passenger is far away from the vehicle airbag system.

In the case where the passenger is adjacent to the vehicle airbag system, when the inflator 400 is activated in response to a collision, the airbag gas supplied from the inflator 400 enters into the retainer 300, and thus inflates the airbag cushion 200.

In the present case where the passenger is located adjacent to the vehicle airbag system, the passenger obstructs initial deployment of the airbag cushion 200. Thus, the deployment of the airbag cushion 200 is not complete, and the tether 500 is not completely pulled by the airbag cushion 200. Here, the tether 500 located inside the retainer 300 reduces the amount of the airbag gas from flowing into the airbag cushion 200, and induces the airbag gas to go towards the housing vent holes 110 of the airbag housing 100. In this manner, since a part of the airbag gas is discharged to the housing vent holes 110 when the airbag cushion 200 begins to be deployed, it is possible to prevent any injury to the passenger from being caused by the airbag cushion 200 abruptly inflating.

On the other hand, in the case where the passenger is far away from the vehicle airbag system, when the inflator 400 is activated in response to a collision, the airbag gas supplied from the inflator 400 enters into the retainer 300, and thus inflates the airbag cushion 200.

In this case, nothing obstructs the deployment of the airbag cushion 200, so that the airbag cushion 200 is inflated, and the tether 500 continues to be pulled, as shown in FIG. 5B. When the communication portion 510 of the tether 500 is introduced into the retainer 300 by the pulling of the tether 500, the airbag gas flows through the communication portion 510, and then into the airbag cushion 200, so that the airbag cushion 200 can be yet further inflated.

Simultaneously, when the restrictor 600 is located between the housing vent holes 110 and the retainer vent holes 330, the pulling of the tether 500 can prevent the airbag gas from being discharged to the housing vent holes 110, and thus the airbag cushion 200 can be rapidly deployed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle airbag system comprising:
   an inflator supplying an airbag gas to an airbag cushion;
   an airbag housing coupled with the inflator and having at least one housing vent hole discharging part of the airbag gas;
   a tether connected to the airbag cushion at a first end thereof and fixed to the airbag housing at a second end thereof;
   a retainer mounted in the airbag housing and guiding a movement of the tether; and
   a restrictor coupled to the second end of the tether and blocking the housing vent hole when pulled by the tether;
   wherein the retainer includes at least one retainer vent hole opposite the housing vent hole, and a pair of guide holes formed in a row in a pulling direction of the tether and supporting the tether.

2. The vehicle airbag system of claim 1, wherein the tether includes a communication portion, which provides a channel for the airbag gas when pulled, at the second end thereof, and the restrictor is coupled to the communication portion.

3. The vehicle airbag system of claim 2, wherein the restrictor is connected to the communication portion via ring portions and is located between the housing vent hole and the retainer vent hole when the airbag cushion is deployed.

4. The vehicle airbag system of claim 2, wherein the restrictor is connected to the communication portion such that tear lines are formed, and the retainer includes cutoff member tearing out the tear lines when the airbag cushion is deployed.

5. The vehicle airbag system of claim 1, wherein the tether is located opposite the inflator at the first end thereof such that the airbag gas is guided towards the housing vent hole when initial deployment of the airbag cushion is obstructed by a passenger.

6. A vehicle airbag system comprising:
   an inflator supplying a gas to an airbag cushion;
   an airbag housing coupled with the inflator and having a housing vent hole to discharge a part of the gas supplied from the inflator;

a retainer mounted in the airbag housing and coupled to the inflator, wherein the airbag cushion covers an opening of the retainer to supply the gas in the airbag cushion, the retainer including a guide hole and a retainer vent hole; and a tether connected to the airbag cushion at a first end portion thereof and fixed to the airbag housing at a second end portion thereof by passing through the guide hole of the retainer, wherein the tether includes a communication portion at the second portion thereof to form a hole therein so as to selectively permit gas commutation between the airbag cushion and the outside through the retainer vent hole, the housing vent hole, and the hole of the communication portion.

7. The vehicle airbag system of claim 6, wherein a restrictor is coupled to the communication portion at the second end portion of the tether and blocks a fluid communication between the retainer and the outside through the housing vent hole and the retainer vent hole when the restrictor is pulled by the second end portion of the tether.

8. The vehicle airbag system of claim 7, wherein the second end portion of the tether having the communication portion is folded between the airbag housing and the retainer and the restrictor is disposed between the airbag housing and the retainer to allow the fluid communication between the retainer and the outside through the housing vent hole and the retainer vent hole when initial deployment of the airbag cushion is obstructed.

9. The vehicle airbag system of claim 7, wherein the restrictor includes a ring portion to be slidably coupled to the communication portion.

10. The vehicle airbag system of claim 9, wherein the ring portion of the restrictor is connected to the communication portion by tear lines and the retainer includes cutoff member to tear out the tear lines when the airbag cushion is fully deployed.

* * * * *